US012189242B2

(12) United States Patent
Hung et al.

(10) Patent No.: US 12,189,242 B2
(45) Date of Patent: *Jan. 7, 2025

(54) ELECTRONIC DEVICE

(71) Applicant: InnoLux Corporation, Miao-Li County (TW)

(72) Inventors: Tang-Chin Hung, Miao-Li County (TW); Zhi-Fu Huang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,483

(22) Filed: Jan. 30, 2024

(65) Prior Publication Data

US 2024/0176191 A1 May 30, 2024

Related U.S. Application Data

(60) Continuation of application No. 18/059,111, filed on Nov. 28, 2022, now Pat. No. 11,921,380, which is a
(Continued)

(30) Foreign Application Priority Data

Dec. 3, 2018 (CN) .......................... 201811465528.0

(51) Int. Cl.
*G02F 1/1339* (2006.01)
*G02F 1/1368* (2006.01)

(52) U.S. Cl.
CPC ...... *G02F 1/13394* (2013.01); *G02F 1/13396* (2021.01); *G02F 1/13398* (2021.01); *G02F 1/1368* (2013.01)

(58) Field of Classification Search
CPC ............ G02F 1/13394; G02F 1/13396; G02F 1/13398; G02F 1/133388
See application file for complete search history.

(56) References Cited

U.S. PATENT DOCUMENTS

| 6,211,937 B1 * | 4/2001 | Miyachi | ............. G02F 1/13394 |
| | | | 349/126 |
| 10,209,578 B2 | 2/2019 | Huang | |

(Continued)

FOREIGN PATENT DOCUMENTS

| CN | 1477428 A | 2/2004 |
| CN | 103576353 A | 2/2014 |

(Continued)

OTHER PUBLICATIONS

Chinese language office action dated Mar. 12, 2024, issued in application No. CN 202210539591.4.
(Continued)

*Primary Examiner* — Jessica M Merlin
(74) *Attorney, Agent, or Firm* — McClure, Qualey & Rodack, LLP (57) ABSTRACT

An electronic device includes a first substrate, a first protrusion, a second protrusion and a plurality of third protrusions. The first substrate includes an edge, a first region, and a second region. The first substrate includes a surface. The first protrusion is in the first region. A maximum distance from the surface to a top surface of the first protrusion is defined as a first distance. The second protrusion is in the second region. A maximum distance from the surface to a top surface of the second protrusion is defined as a second distance. The first protrusion is disposed between two of the third protrusions. A maximum distance from the surface to a top surface of the third protrusion is defined as a third (Continued)

distance. The first distance is different from the second distance, and the third distance is less than the first distance.

9 Claims, 8 Drawing Sheets

Related U.S. Application Data continuation of application No. 17/386,929, filed on Jul. 28, 2021, now Pat. No. 11,537,010, which is a division of application No. 16/426,175, filed on May 30, 2019, now Pat. No. 11,106,093.

(60) Provisional application No. 62/688,457, filed on Jun. 22, 2018.

(56) References Cited

U.S. PATENT DOCUMENTS

| | | | | |
|---|---|---|---|---|
| 11,921,380 | B2* | 3/2024 | Hung | G02F 1/13394 |
| 2009/0290117 | A1* | 11/2009 | Watanabe | G02F 1/133305 |
| | | | | 349/153 |
| 2011/0007251 | A1* | 1/2011 | Yamamoto | G02F 1/133514 |
| | | | | 349/108 |
| 2014/0347614 | A1 | 11/2014 | Asada | |
| 2019/0121185 | A1 | 4/2019 | Liu et al. | |
| 2019/0331953 | A1* | 10/2019 | Park | G02F 1/13394 |

FOREIGN PATENT DOCUMENTS

| | | |
|---|---|---|
| CN | 104040415 A | 9/2014 |
| CN | 105278174 A | 1/2016 |
| CN | 207352324 U | 5/2018 |

OTHER PUBLICATIONS

Chinese language office action dated Aug. 21, 2024, issued in application No. CN 202210540547.5.

* cited by examiner

ELECTRONIC DEVICE

CROSS REFERENCE TO RELATED APPLICATIONS

This application is a Continuation of U.S. patent application Ser. No. 18/059,111 filed Nov. 28, 2022, now U.S. Pat. No. 11,921,380, which is a Continuation of U.S. patent application Ser. No. 17/386,929, filed Jul. 28, 2021, now U.S. Pat. No. 11,537,010, which is a Divisional of U.S. patent application Ser. No. 16/426,175, filed May 30, 2019, now U.S. Pat. No. 11,106,093, which claims priority to U.S. Provisional Application Ser. No. 62/688,457, filed on Jun. 22, 2018 and China Patent Application No. 201811465528.0, filed on Dec. 3, 2018, the entirety of which are incorporated by reference herein.

BACKGROUND

Technical Field

The present disclosure relates to an electronic modulating device, and in particular to an electronic modulating device that includes adjustment units.

Description of the Related Art

Electronic products, such as smartphones, tablets, notebooks, monitors, and TVs, have become indispensable necessities in modern society. With the flourishing development of such portable electronic products, consumers have high expectations regarding the quality, functionality, or price of such products. These electronic products are often used as electronic modulating devices, for modulating electromagnetic waves. However, a new electronic modulating device that is suitable for use in a variety of surroundings is needed.

SUMMARY

In accordance with some embodiments of the present disclosure, an electronic device is provided. The electronic device includes a first substrate, a first protrusion, a second protrusion and a plurality of third protrusions. The first substrate includes an edge, a first region, and a second region. The second region is disposed between the edge and the first region. The first substrate further includes a surface, and the surface has a normal direction. The first protrusion is disposed on the surface of the first substrate in the first region. A maximum distance from the surface of the first substrate to a first top surface of the first protrusion along the normal direction is defined as a first distance. The second protrusion is disposed on the surface of the first substrate in the second region. A maximum distance from the surface of the first substrate to a second top surface of the second protrusion along the normal direction is defined as a second distance. The plurality of third protrusions are disposed on the surface of the first substrate. The first protrusion is disposed between two of the plurality of third protrusions. A maximum distance from the surface of the first substrate to a third top surface of at least one of the plurality of third protrusions along the normal direction is defined as a third distance. In addition, the first distance is different from the second distance, and the third distance is less than the first distance.

A detailed description is given in the following embodiments with reference to the accompanying drawings.

BRIEF DESCRIPTION OF THE DRAWINGS

The disclosure may be understood by reading the subsequent detailed description and examples with references made to the accompanying drawings, wherein.

DETAILED DESCRIPTION

The electronic modulating device of the present disclosure and the manufacturing method thereof are described in detail in the following description. In the following detailed description, for purposes of explanation, numerous specific details and embodiments are set forth in order to provide a thorough understanding of the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements. However, the use of like and/or corresponding numerals in the drawings of different embodiments does not suggest any correlation between different embodiments. In addition, in this specification, expressions such as "first material layer disposed above/on/over a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

In addition, in this specification, relative expressions are used. For example, "upper" or "lower" is used to describe the position of one element relative to another. It should be appreciated that if a device is flipped upside down, an element that is on the "bottom" will become an element that is on the "top".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing. In the drawings, some components may be omitted for clarity. Moreover, some components in the drawings may be eliminated as another embodiment of the present disclosure.

The terms "about" and "substantially" typically mean +/−20% of the stated value, +/−10% of the stated value, +/−5% of the stated value, +/−3% of the stated value, +/−2% of the stated value, +/−1% of the stated value or +/−0.5% of the stated value. The stated value of the present disclosure is an approximate value. When there is no specific description, the stated value includes the meaning of "about" or "substantially". Moreover, when considering the deviation or the fluctuation of the manufacturing process, the term "same" may also include the meaning of "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

The term "substrate" may include elements and films that are already formed on the substrate, and may include a plurality of active elements, such as transistors. For brevity, it is illustrated in a plate substrate.

In addition, in some embodiments of the present disclosure, terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

In addition, the phrase "in a range from a first value to a second value" indicates the range includes the first value, the second value, and other values in between.

In addition, the term "cover" includes the meaning of "cover partially" or "cover completely".

Figure 1:
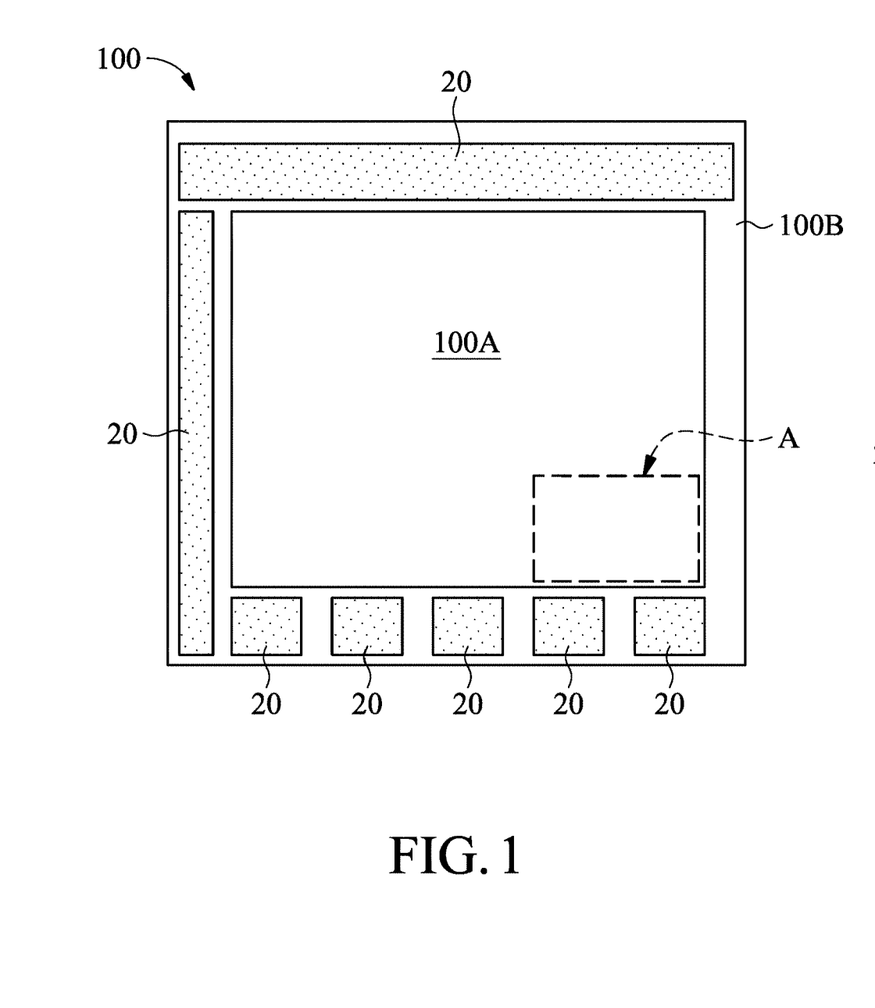
FIG. 1 illustrates a top view of an electronic modulating device in accordance with some embodiments of the present disclosure.

Refer to FIG. 1, which illustrates a top view of an electronic modulating device 100 in accordance with some embodiments of the present disclosure. The electronic modulating device 100 may include a working region 100A and a non-working region 100B as shown in FIG. 1. The working region 100A may include a working device (shown in FIG. 8A). The non-working region 100B may be adjacent to the working region 100A. The electronic modulating device 100 may include an integrated circuit (IC) therein. The IC may include various passive and active microelectronic devices, such as thin film resistors, other capacitors (e.g. metal-insulator-metal capacitor, MIMCAP), inductors, diodes, metal-oxide-semiconductor field effect transistors (MOSFETs), complementary MOS (CMOS) transistors, bipolar junction transistors (BJTs), laterally diffused MOS (LDMOS) transistors, high power MOS transistors, and other types of transistors.

Figure 2:
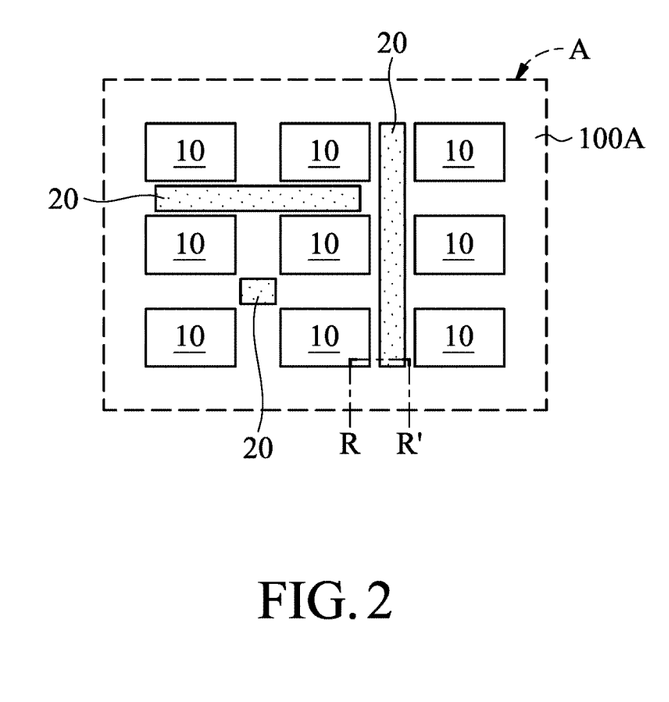
FIG. 2 illustrates an enlarged view of region A of the electronic modulating device in accordance with some embodiments of the present disclosure.

Refer to FIG. 2, which illustrates an enlarged view of region A of the electronic modulating device 100 in accordance with some embodiments of the present disclosure. As shown in FIG. 2A, the working region 100A may include a plurality of first portions 10 and a plurality of second portions 20. In some embodiments, there is at least one working device in the first portion 10. The first portion 10 may be a M×N array, wherein M and N are positive integers. However, the scope of the disclosure is not intended to be limited. The second portion 20 may be adjacent to the first portion 10. For example, the second portion 20 may be disposed in a region between two first portions 10, have an arbitrary size, and be arranged in an arbitrary way. In some embodiments, there may be no working device in the second portion 20. In some embodiments, the adjustment unit (shown in FIG. 3B) that has less recovering force per unit area may be disposed on the first portion 10; the adjustment unit (shown in FIG. 3B) that has greater recovering force per unit area may be disposed on the second portion 20.

Refer to FIG. 1, the non-working region 100B may have a plurality of second portion 20. The second portion 20 may have an arbitrary size, and be arranged in an arbitrary way. However, the scope of the disclosure is not intended to be limited.

Figure 3A:
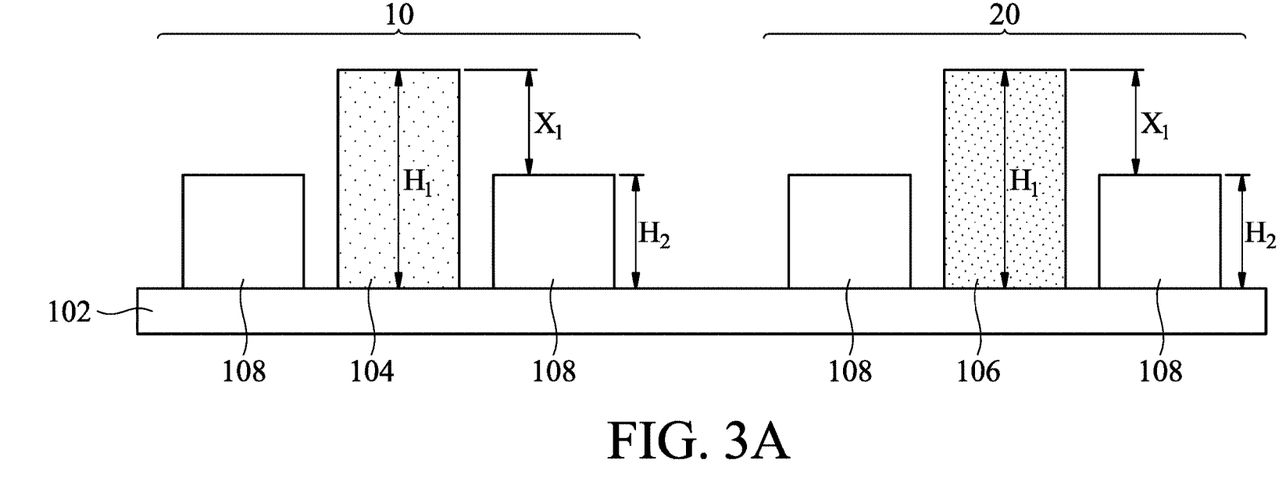
FIGS. 3A and 3B illustrate cross-sectional views of different stages of a process for manufacturing the electronic modulating device in accordance with some embodiments of the present disclosure.
Figure 3B:
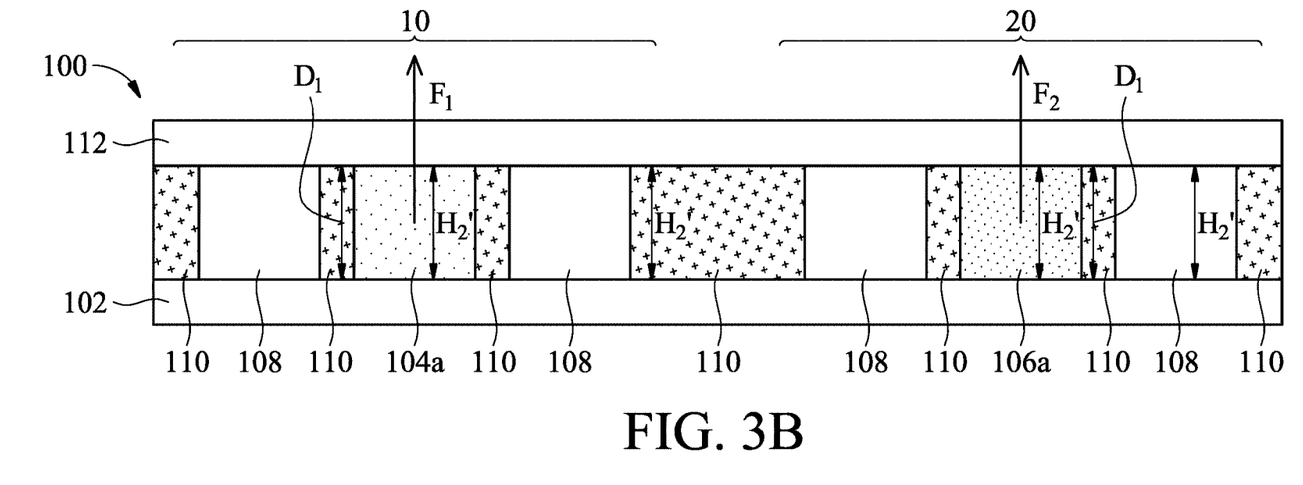

Refer to FIGS. 3A and 3B, which illustrate cross-sectional views of different stages of a process for manufacturing the electronic modulating device 100 in accordance with some embodiments of the present disclosure. The cross-sectional view of FIG. 3A corresponds to line R-R' of the working region 100A of FIG. 2. As shown in FIG. 3A, a first substrate 102 is provided. It should be appreciated that the first substrate 102 may include a plurality of layers and various elements formed in and/or on them. For brevity, the first substrate 102 is illustrated in one layer. There is at least one working device disposed on the region of the first substrate 102 corresponding to the first portion 10. There may be no working device on the region of the first substrate 102 corresponding to the second portion 20.

As shown in FIG. 3A, at least one adjustment unit 104 is disposed on the first portion 10 of the first substrate 102, and at least one adjustment unit 106 is disposed on the second portion 20 of the first substrate 102. In some embodiments, the material of the adjustment unit 104 and/or adjustment unit 106 may include, but is not limited to, photoresist or another suitable material. In some embodiments, the adjustment unit 104 and/or the adjustment unit 106 may have a rectangle shape in top view. The adjustment unit 104 and/or adjustment unit 106 may be arranged in one or more directions. There is a gap between two adjacent adjustment units 104 and/or adjustment units 106 so that a modulating material layer 110, shown in FIG. 3B, may flow therein. In this embodiment, the adjustment unit 104 and the adjustment unit 106 may be a spacer formed by photoresist, respectively. The adjustment unit 104 and the adjustment unit 106 may have a thickness $H_1$. In the present disclosure, the thickness and/or height may be measured in central region along the normal direction of the first substrate 102. The thickness and/or height may be a single value or an average of multiple values. In some embodiments, the thickness and/or height may be a maximum thickness and/or height measured. In some embodiments, the adjustment unit 104 has a first elastic coefficient $K_1$, and the adjustment unit 106 has a second elastic coefficient $K_2$. The second elastic coefficient $K_2$ is greater than the first elastic coefficient $K_1$. In the present disclosure, the elastic coefficient may indicate spring constant whose unit is N/m. The elastic coefficient may also indicate Young's modulus whose unit is $N/m^2$. In this embodiment, the material of the adjustment unit 104 may be the same as that of the adjustment unit 106, but the densities of them may be different. In some embodiments, the density of the adjustment unit 106 may be greater than that of the adjustment unit 104 so that the elastic coefficient of the adjustment unit 106 is greater than that of the adjustment unit 104. However, the scope of the disclosure is not intended to be limited. In other embodiments, the material of the adjustment unit 104 may be different from that of the adjustment unit 106. For example, the adjustment unit 104 and the adjustment unit 106 may be formed by two photoresists that are made by different species so that the adjustment unit 104 and the adjustment unit 106 may have different elastic coefficients. In addition, other methods may be used to differentiate the elastic coefficients of the adjustment unit 104 and the adjustment unit 106.

In some embodiments, a plurality of adjustment units 108 are disposed on the first portion 10 and/or the second portion 20 of the first substrate 102. The material of the adjustment unit 108 may include, but is not limited to, photoresist or another suitable material. As shown in FIG. 3A, the adjustment unit 108 may have the thickness $H_2$. In some embodiments, the adjustment unit 108 may have third elastic coefficient $K_3$. The third elastic coefficient $K_3$ may be greater than the second elastic coefficient $K_2$. In some embodiments, at least one adjustment unit 108 may be disposed between the adjustment unit 104 and the adjustment unit 106. The adjustment unit 104 may be disposed between two adjacent adjustment units 108; the adjustment unit 106 may be disposed between two adjacent adjustment units 108. As shown in FIG. 3A, there is a thickness difference $X_1$ between the adjustment unit 104 and the adjustment unit 108, and there is the thickness difference $X_1$ between the adjustment unit 106 and the adjustment unit 108.

In some embodiments, the adjustment unit 104, the adjustment unit 106 and the adjustment unit 108 may have different size, such as different area or shape of top surface, or different area or shape of side surface.

Next, as shown in FIG. 3B, a second substrate 112 is disposed on the first substrate 102 so that the adjustment unit 104 and the adjustment unit 106 are compressed. As a result, the electronic modulating device 100 is created. As shown in FIG. 3B, the adjustment unit 104a, the adjustment unit 106a and the adjustment unit 108 are disposed between the first substrate 102 and the second substrate 112. In addition, the adjustment unit 104a, the adjustment unit 106a and the adjustment unit 108 may have the thickness $H_2'$. The thickness $H_2'$ may be less than or equal to the thickness $H_2$. In some embodiments, the electronic modulating device 100 may include the modulating material layer 110. The modulating material layer 110 is disposed between the first substrate 102 and the second substrate 112. The material of the modulating material layer 110 may include, but is not limited to, liquid crystal or another suitable modulating material.

It should be appreciated that the second substrate 112 may include a plurality of layers and various elements formed in and/or on them. For brevity, the second substrate 112 is illustrated in one layer. In some embodiments, the second substrate 112 may have at least one flexible film so that the second substrate 112 would have a bumpy or oblique surface.

In some embodiments, the distances between the first substrate 102 and the second substrate 112 that are in different regions are substantially equal. For example, the distance between the first portion 10 of the first substrate 102 and the second substrate 112 is $D_1$, and the distance between the second portion 20 of the first substrate 102 and the second substrate 112 is also $D_1$. As shown in FIGS. 3A and 3B, there is the thickness difference $X_1$ between the compressed adjustment unit 104a and the adjustment unit 104 not compressed; there is the thickness difference $X_1$ between the compressed adjustment unit 106a and the adjustment unit 106 not compressed. In this embodiment, the adjustment unit 108 is substantially not compressed. The compressed adjustment unit 104a and adjustment unit 106a may have first recovering force $F_1$ and second recovering force $F_2$, respectively. The recovering force mentioned herein may indicate elastic force. The first recovering force $F_1$ and the second recovering force $F_2$ may fit Hooke's law as shown below:

$$F = -K\Delta X \qquad \text{equation (1)}$$

In equation (1), K indicates elastic coefficient, and $\Delta X$ indicates the length or thickness that is compressed. Negative sign means that the direction of the recovering force may be different from that of compression or stretch.

In this embodiment, $F_1 = -K_1 X_1$, and $F_2 = -K_2 X_1$. Namely, the recovering force of the adjustment unit 104a may substantially be equal to $K_1 X_1$, and the recovering force of the adjustment unit 106a may substantially be equal to $K_2 X_1$. Since the compressed length of the adjustment unit 104a is substantially the same as that of the adjustment unit 106a, the recovering force of the adjustment unit 104a and the adjustment unit 106a may be dependent on their elastic coefficients. As the second elastic coefficient $K_2$ of the adjustment unit 106a is greater than the first elastic coefficient $K_1$ of the adjustment unit 104a, the second recovering force $F_2$ is greater than the first recovering force $F_1$. It should be appreciated that the direction of the recovering force shown in FIG. 3B is merely exemplary, and the direction of the recovering force generated by the adjustment unit 104a and the adjustment unit 106a may not be limited to one direction. In some embodiments, the direction of the first recovering forces $F_1$ and the second recovering force $F_2$ may be the same as the normal direction of the first substrate 102. In addition, the recovering force generated by the adjustment unit 108 is equal to 0 because the compressed length of the adjustment unit 108 is substantially equal to 0.

Figure 4:
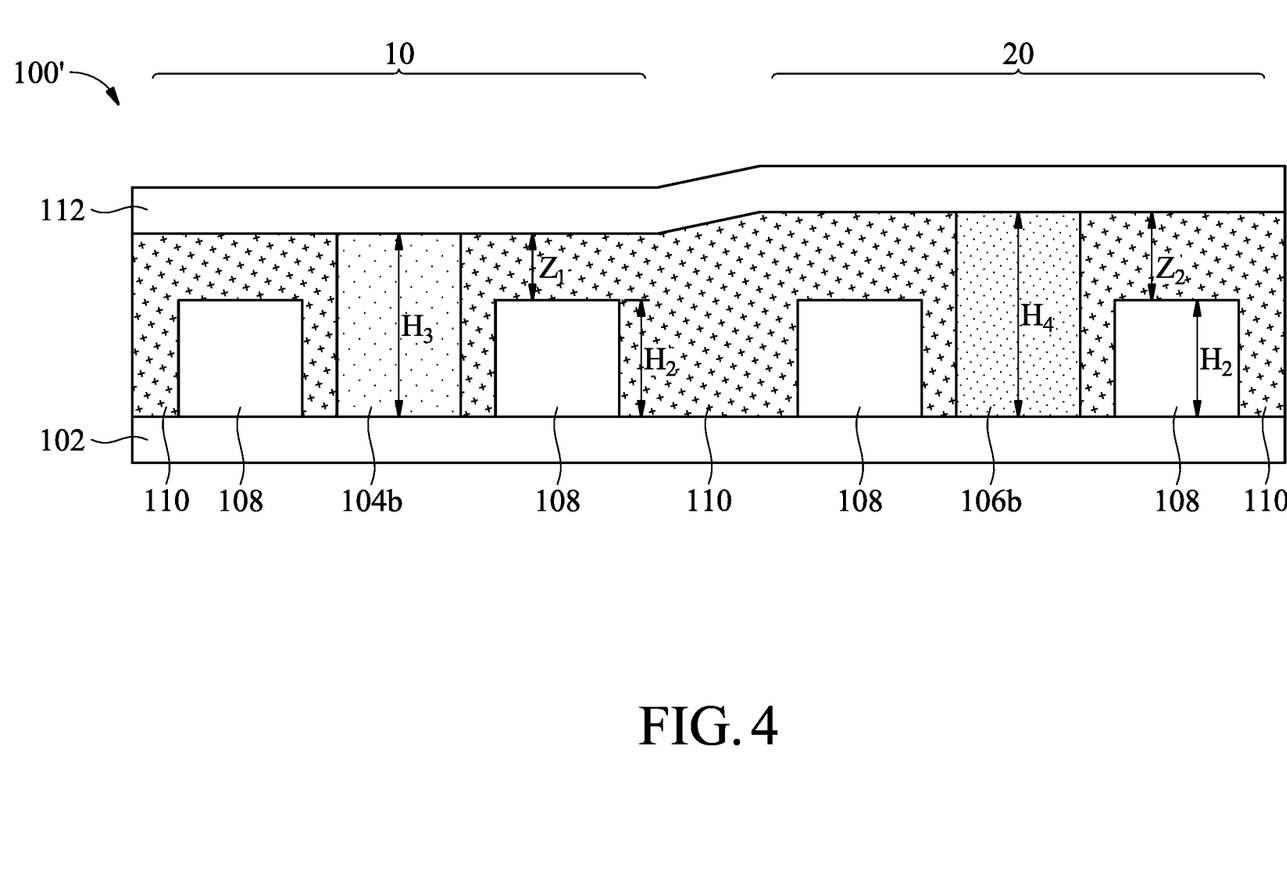
FIG. 4 illustrates a cross-sectional view of an electronic modulating device in accordance with some embodiments of the present disclosure.

Refer to FIG. 4, which illustrates a cross-sectional view of the electronic modulating device 100' in accordance with some embodiments of the present disclosure. The electronic modulating device 100 becomes the electronic modulating device 100' when its volume changes. As mentioned above, the second recovering force $F_2$ may be greater than the first recovering force $F_1$. Therefore, the recovering force pushing on the region of the second substrate 112 that corresponds to the second portion 20 is greater than that corresponds to the first portion 10. As a result, the distance between the first substrate 102 and the second substrate 112 that corresponds to the first portion 10 may be the distance $Z_1$ plus the thickness $H_2$, and the distance between the first substrate 102 and the second substrate 112 that corresponds to the second portion 20 may be the distance $Z_2$ plus the thickness $H_2$. The sum of the distance $Z_1$ and the thickness $H_2$ is less than that of the distance $Z_2$ and the thickness $H_2$. The distance $Z_1$ may less than the distance $Z_2$. In other embodiments, the adjustment unit 104b may have the thickness $H_3$, and the adjustment unit 106b may have the thickness $H_4$. As shown in FIG. 4, the thickness $H_4$ may be greater than the thickness $H_3$. In this embodiment, the distance between the first substrate 102 and the second substrate 112 that corresponds to the first portion 10 is substantially equal to the thickness $H_3$, and the distance between the first substrate 102 and the second substrate 112 that corresponds to the second portion 20 is substantially equal to the thickness $H_4$.

In some cases, deformation of the second substrate 112 may occur due to the volume change of the electronic modulating device heated so that the distance between the first substrate 102 and the second substrate 112 would increase. As a result, the capacitance of the electronic modulating device may change, which influences the performance of the electronic modulating device. In this embodiment, the adjustment unit 104, having less elastic coefficient, is disposed on the first portion 10 on which the working device is disposed; the adjustment unit 106, having greater elastic coefficient, is disposed on the second portion 20 on which the no working device is disposed. As shown in FIG. 4, when the volume of the electronic modulating device changes due to heat, the distance difference between the first portion 10 of the first substrate 102 and the second substrate 112 is less than that between the second portion 20 of the first substrate 102 and the second substrate 112. Namely, the region on which the working device is disposed has less distance difference. Therefore, the working device is stable when temperature changes, thereby improving the reliability of the electronic modulating device 100.

Figure 5A:
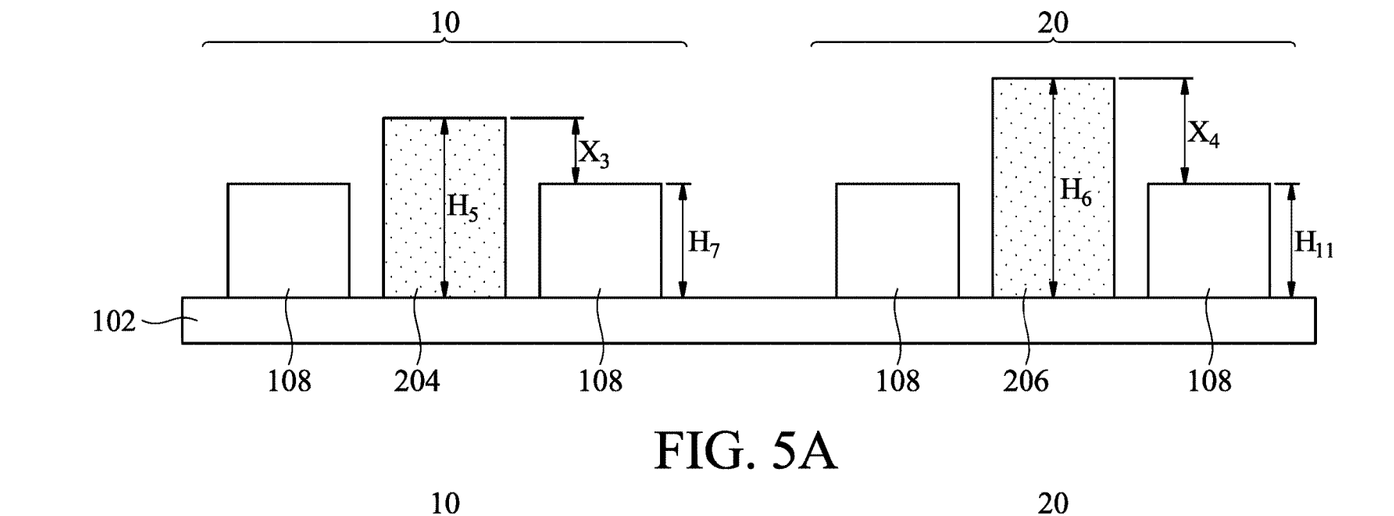
FIGS. 5A and 5B illustrate cross-sectional views of different stages of a process for manufacturing the electronic modulating device in accordance with some embodiments of the present disclosure.
Figure 5B:
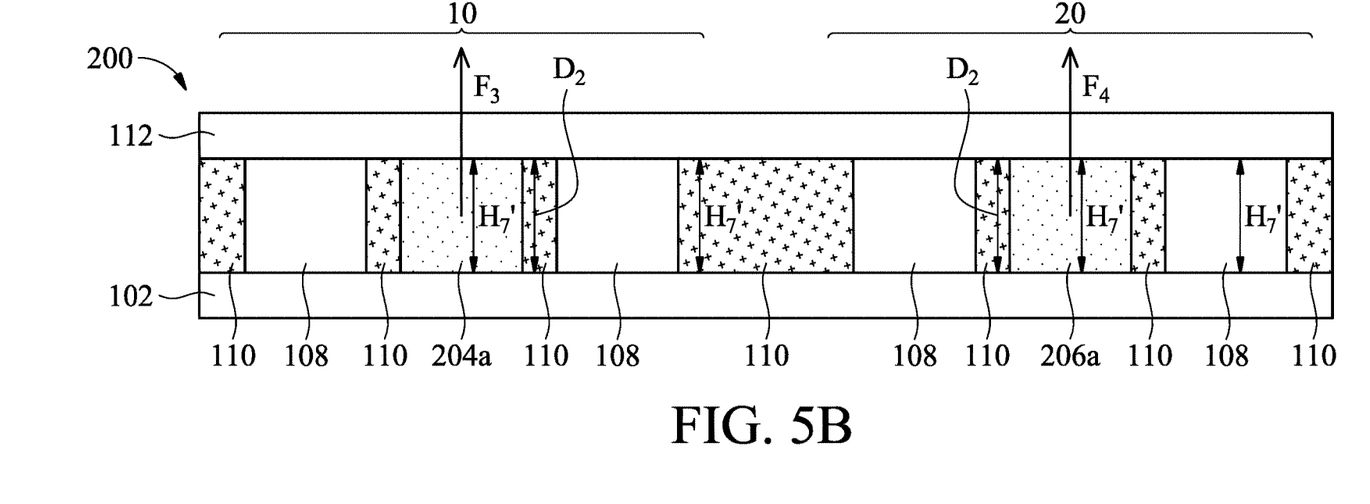

Many variations and/or modifications can be made to embodiments of the disclosure Refer to FIGS. 5A and 5B, which illustrate cross-sectional views of different stages of a process for manufacturing the electronic modulating device in accordance with some embodiments of the present disclosure. The structure of FIG. 5A may be the same as or similar to that of FIG. 3A, and one of the differences is that the adjustment units 104 are replaced by adjustment units 204, and the adjustment units 106 are replaced by adjustment units 206. In some embodiments, the material of the adjustment unit 204 may be the same as that of the adjustment unit 206, and the density of the adjustment unit 204 may be the same as that of the adjustment unit 206. Therefore, the adjustment unit 204 and the adjustment unit 206 may substantially have the same elastic coefficient. In some embodiments, the adjustment unit 204 and the adjustment unit 206 have fourth elastic coefficient $K_4$. As shown in FIG. 5A, the adjustment unit 204 may have the thickness $H_5$, and the adjustment unit 204 may have the thickness $H_6$. The thickness $H_6$ is greater than the thickness $H_5$. In addition, the adjustment unit 108 may have the thickness $H_7$, and may have third elastic coefficient $K_3$ that is greater than the fourth elastic coefficient $K_4$. As shown in FIG. 5A, there is a thickness difference $X_3$ between the adjustment unit 204 and the adjustment unit 108, and there is a thickness difference $X_4$ between the adjustment unit 206 and the adjustment unit 108. The thickness difference $X_4$ may be greater than the thickness difference $X_3$. In some embodiments, the adjustment unit 204, the adjustment unit 206 and the adjustment unit 108 may have different size, such as different area or shape of top surface, or different area or shape of side surface.

Next, as shown in FIG. 5B, the modulating material layer 110 is filled on the first substrate 102 and the second substrate 112 is disposed on the first substrate 102 so that the adjustment unit 204 and the adjustment unit 206 are compressed. As a result, the electronic modulating device 200 is created. As shown in FIG. 5B, the adjustment unit 204a, the adjustment unit 206a, the adjustment unit 108 and the modulating material layer 110 are disposed between the first substrate 102 and the second substrate 112. Moreover, the adjustment unit 204a, the adjustment unit 206a and the adjustment unit 108 may have the thickness $H_7'$. The thickness $H_7'$ is less than or equal to the thickness $H_7$.

In some embodiments, in the electronic modulating device 200, the distances between the first substrate 102 and the second substrate 112 that are in different regions are substantially equal. For example, the distance between the first portion 10 of the first substrate 102 and the second substrate 112 is $D_2$, and the distance between the second portion 20 of the first substrate 102 and the second substrate 112 is also $D_2$. As shown in FIGS. 5A and 5B, there is the thickness difference $X_3$ between the compressed adjustment unit 204a and the adjustment unit 204 not compressed; there is the thickness difference $X_4$ between the compressed adjustment unit 206a and the adjustment unit 206 not compressed. In this embodiment, the adjustment unit 108 is substantially not compressed. The compressed adjustment unit 204a and adjustment unit 206a may have third recovering force $F_3$ and fourth recovering force $F_4$, respectively. The third recovering force $F_3$ and the fourth recovering force $F_4$ may fit Hooke's law. In this embodiment, $F_3=-K_4X_3$, and $F_4=-K_4X_4$. Namely, the recovering force of the adjustment unit 204a may substantially be equal to $K_4X_3$, and the recovering force of the adjustment unit 206a may substantially be equal to $K_4X_4$. Since the elastic coefficient of the adjustment unit 204a is substantially the same as that of the adjustment unit 206a, the recovering force of the adjustment unit 204a and the adjustment unit 206a may be dependent on their compressed length. As the thickness difference $X_4$ is greater than the thickness difference $X_3$, the fourth recovering force $F_4$ is greater than the third recovering force $F_3$. It should be appreciated that the third recovering force $F_3$ and/or the fourth recovering force $F_4$ in FIG. 5B is merely exemplary. In fact, the direction of the recovering force generated by the adjustment unit 204a and the adjustment unit 206a may not be limited to one direction. In some embodiments, the direction of the third recovering force $F_3$ and the fourth recovering force $F_4$ may be the same as the normal direction of the first substrate 102.

Figure 6:
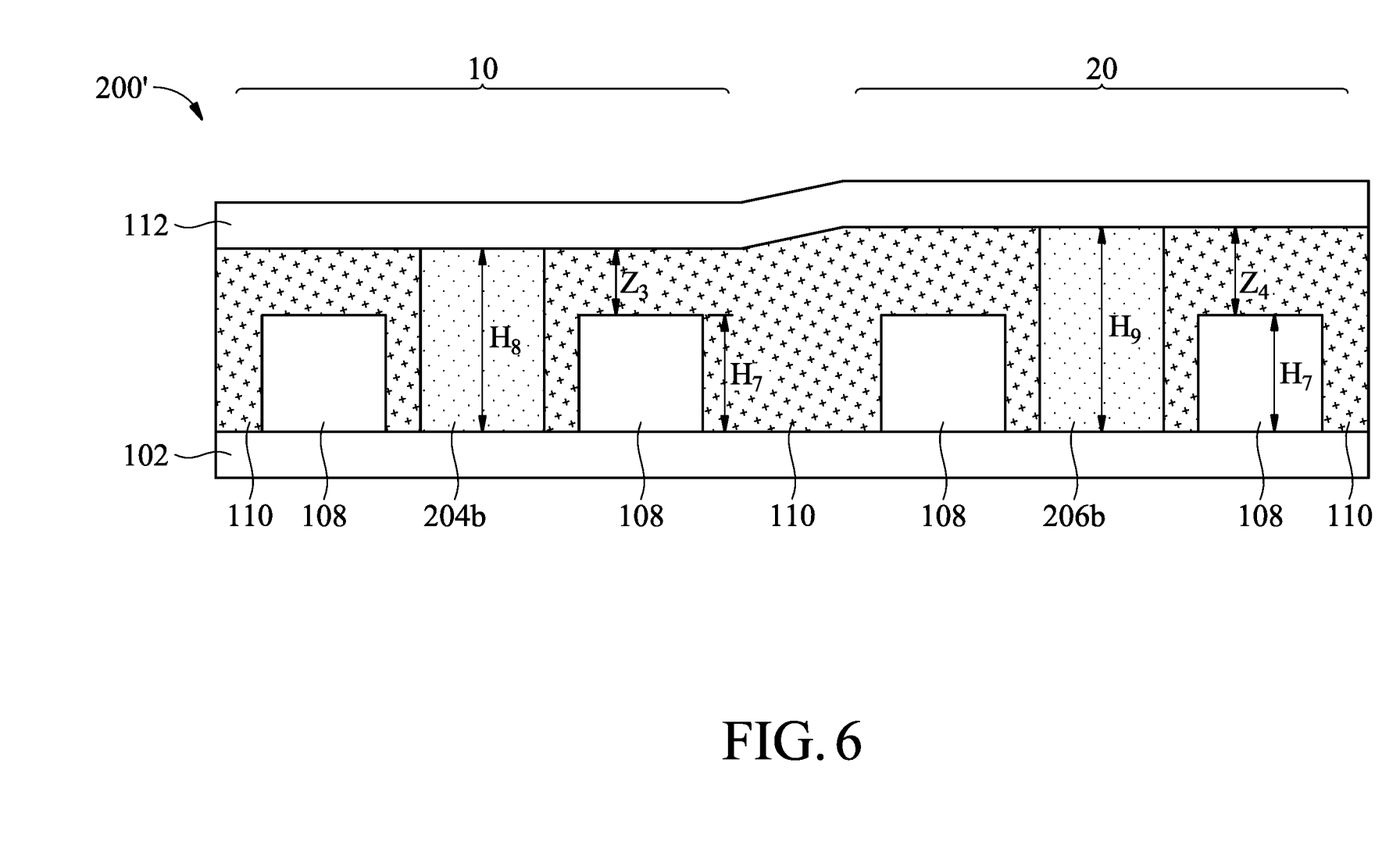
FIG. 6 illustrates a cross-sectional view of the electronic modulating device in accordance with some embodiments of the present disclosure.

Refer to FIG. 6, which illustrates a cross-sectional view of the electronic modulating device 200' in accordance with some embodiments of the present disclosure. The electronic modulating device 200 becomes the electronic modulating device 200' when its volume expands. As mentioned above, the fourth recovering force $F_4$ may be greater than the third recovering force $F_3$. Therefore, the recovering force pushing on the region of the second substrate 112 that corresponds to the second portion 20 is greater than that corresponds to the first portion 10. As a result, the distance between the first substrate 102 and the second substrate 112 that corresponds to the first portion 10 may be the distance $Z_3$ plus the thickness $H_7$, and the distance between the first substrate 102 and the second substrate 112 that corresponds to the second portion 20 may be the distance $Z_4$ plus the thickness $H_7$. The sum of the distance $Z_3$ and the thickness $H_7$ is less than that of the distance $Z_4$ and the thickness $H_7$. In other embodiments, the adjustment unit 204b may have the thickness $H_8$, and the adjustment unit 206b may have the thickness $H_9$. As shown in FIG. 6, the thickness $H_9$ may be greater than the thickness $H_8$. In this embodiment, the distance between the first substrate 102 and the second substrate 112 that corresponds to the first portion 10 is substantially equal to the thickness $H_8$, and the distance between the first substrate 102 and the second substrate 112 that corresponds to the second portion 20 is substantially equal to the thickness $H_9$, which is greater than the thickness $H_8$.

Figure 7:
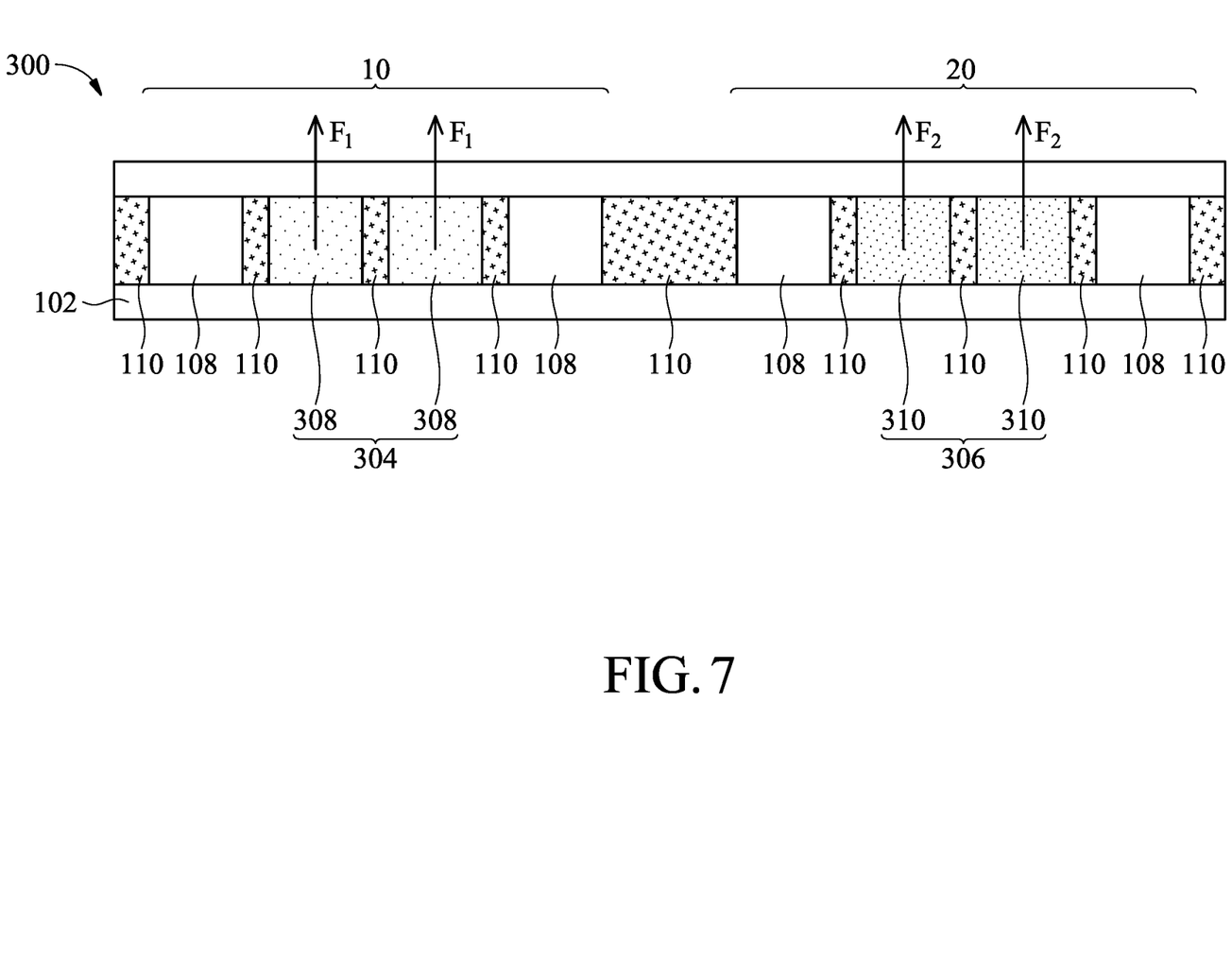
FIG. 7 illustrates a cross-sectional view of an electronic modulating device in accordance with some embodiments of the present disclosure.

Many variations and/or modifications can be made to embodiments of the disclosure. Refer to FIG. 7, which illustrates a cross-sectional view of the electronic modulating device 300 in accordance with some embodiments of the present disclosure. The electronic modulating device 300 may be the same as or similar to that of the electronic modulating device 100, and one of the differences is that the adjustment units 104 are replaced by adjustment units 304, and the adjustment units 106 are replaced by adjustment units 306. As shown in FIG. 9, the adjustment unit 304 includes a plurality of spacers 308, and the adjustment unit 306 includes a plurality of spacers 310. The material of the spacer 308 and the spacer 310 may be the same as or similar to that of the adjustment unit 104 and the adjustment unit 106, respectively, and is not repeated herein. In other embodiments, the material of the spacer 308 may be different from that of the spacer 310. FIG. 7 illustrates the adjustment unit 304 includes two spacers 308, and the adjustment unit 306 includes two spacers 310. In other embodiments, the adjustment unit 304 may include more than one spacer 308, and the adjustment unit 306 may include more than one spacers 310. The number of spacers 308 per unit area may be different from the number of spacers 310 per unit area. For example, the number of spacers 308 per unit area may be greater than or less than the number of spacers 310 per unit area. The unit area may be, but is not limited to, a rectangle region of 5 cm×5 cm, 3 cm×3 cm, 1 cm×1 cm or another suitable region. In this embodiment, there are two recovering forces $F_1$ pushing on the second substrate 112 in the region that corresponds to the first portion 10, and there are two second recovering forces $F_2$ pushing on the second substrate 112 in the region that corresponds to the second portion 20. Since the second recovering force $F_2$ is greater than the first recovering force $F_1$, the distance difference between the first portion 10 of the first substrate 102 and the second substrate 112 is less than that between the second portion 20 of the first substrate 102 and the second substrate 112 when the electronic modulating device 300 is heated causing the volume changes.

In other embodiments, the adjustment unit 304 may include a plurality of spacers 308 whose elastic constant is respectively $K_{n1}$, $K_{n2}$, $K_{n3}$, and so on; compressed length is respectively $X_{n1}$, $X_{n2}$, $X_{n3}$, and so on. The adjustment unit 306 may include a plurality of spacers 310 whose elastic constant is respectively $K_{m1}$, $K_{m2}$, $K_{m3}$, and so on; compressed length is respectively $X_{m1}$, $X_{m2}$, $X_{m3}$, and so on. A portion of the compressed length and/or the elastic coefficient may be different. The number of spacers 308 may be different from the number of spacers 310. The recovering force of the adjustment unit 304 may be "$K_{n1}X_{n1}+K_{n2}X_{n2}+K_{n3}X_{n3}+\ldots$"; the recovering force of the adjustment unit 306 may be "$K_{m1}X_{m1}+K_{m2}X_{m2}+K_{m3}X_{m3}+\ldots$." The recovering force of the adjustment unit 304 may less than the recovering force of the adjustment unit 306.

Figure 8A:
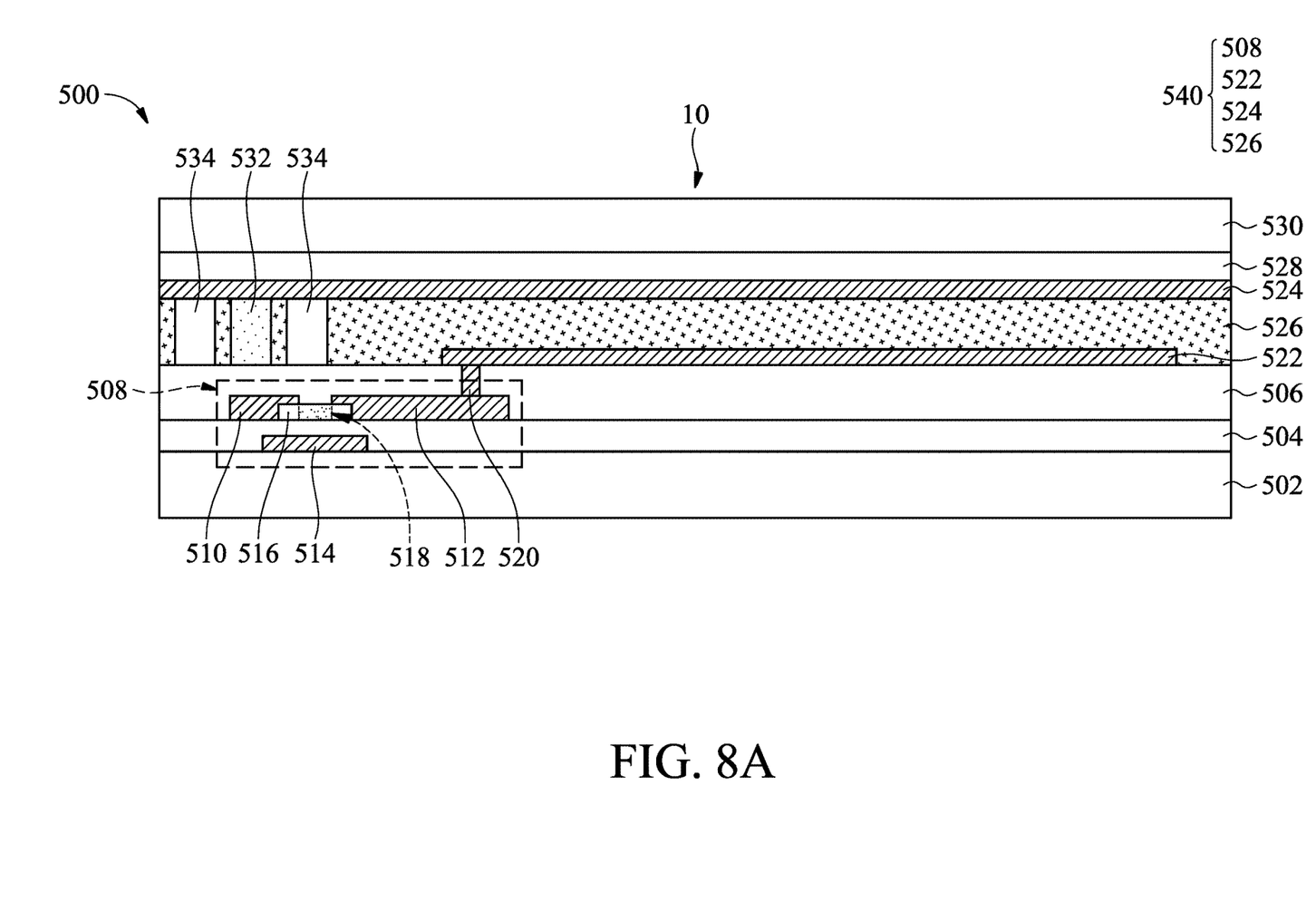
FIGS. 8A and 8B illustrate cross-sectional views of the first portion and the second portion of the electronic modulating device in accordance with some embodiments of the present disclosure.
Figure 8B:
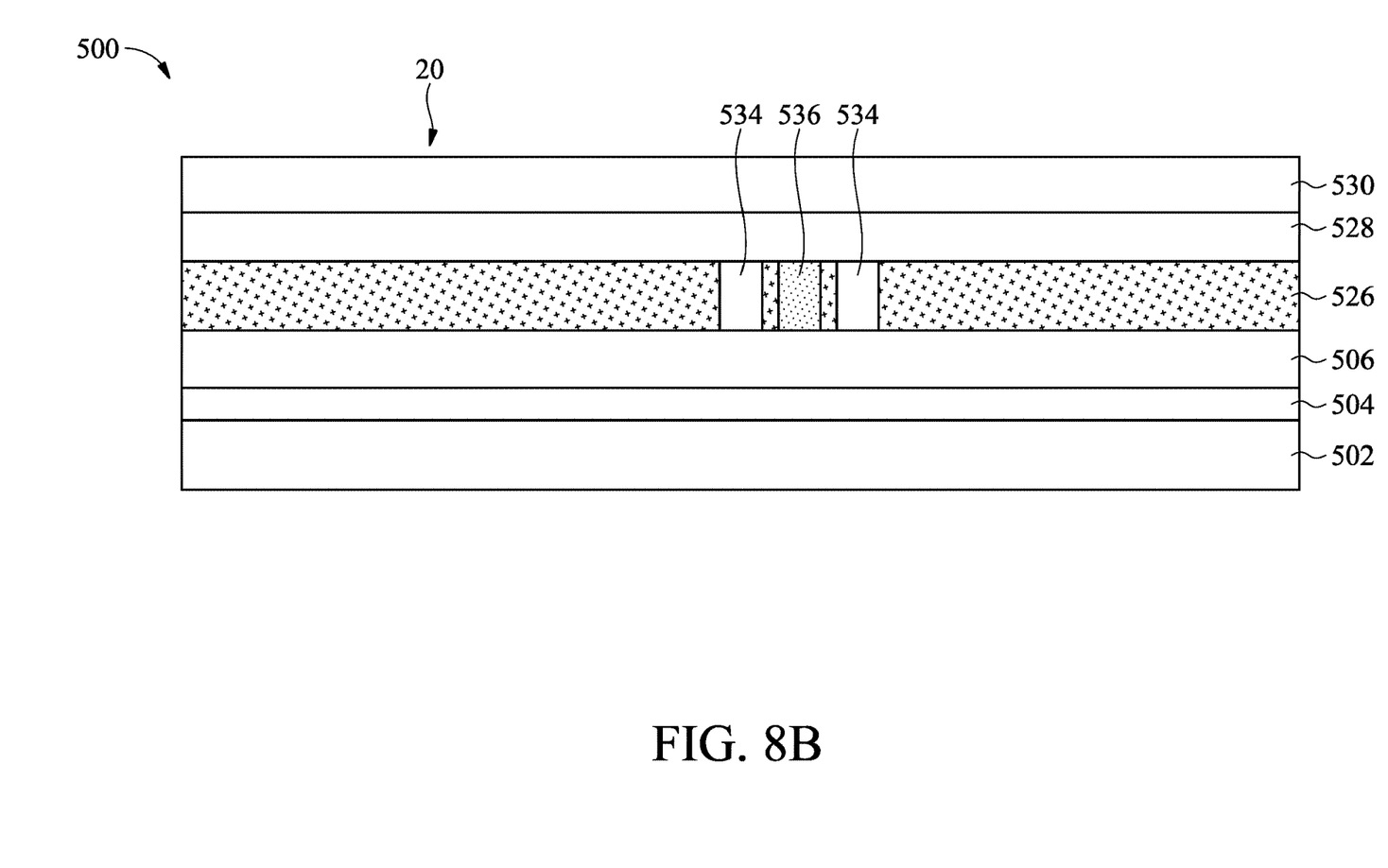

Refer to FIGS. 8A and 8B, FIG. 8A illustrates a cross-sectional view of the first portion 10 of an electronic modulating device 500, and FIG. 8B illustrates a cross-sectional view of the second portion 20 of the electronic modulating device 500 in accordance with some embodiments of the present disclosure. The electronic modulating device 500 shown in FIGS. 8A and 8B is merely exemplary, and the scope of the disclosure is not intended to be limited. For brevity, some elements are omitted in FIGS. 8A and 8B.

In some embodiments, the elements illustrated in FIGS. 8A and 8B may be omitted. The first portion 10 of the electronic modulating device 500 may correspond to the first portion 10 of the electronic modulating device 100, 200 or 300. The second portion 20 of the electronic modulating device 500 may correspond to the second portion 20 of the electronic modulating device 100, 200 or 300.

As shown in FIGS. 8A and 8B, the electronic modulating device 500 may include a substrate 502. The substrate 502 may be used to let the working device or other elements dispose thereon. The substrate 502 may include, but is not limited to, glass substrate, ceramic substrate, polymer substrate or another suitable substrate. The electronic modulating device 500 may include an insulating layer 504 and a protective layer 506. The insulating layer 504 may be disposed on the substrate 502, and the protective layer 506 may be disposed on the insulating layer 504. The material of the insulating layer 504 may include, but is not limited to, silicon oxide, silicon nitride or another suitable dielectric material. The material of the protective layer 506 may include, but is not limited to, phosphosilicate glass (PSG), borophosphosilicate glass (BPSG), low dielectric constant (low-k) material, or another suitable material. The low dielectric constant dielectric materials may include, but are not limited to, fluorinated silica glass (FSG), carbon doped silicon oxide, amorphous fluorinated carbon, parylene, bis-benzocyclobutenes (BCB), polyimides, or another suitable material.

As shown in FIG. 8A, there is at least one working device 540 that is formed on the first portion 10 of the substrate 502. The working device 540 may include a driving element 508, a first electrode 522, a second electrode 524 and a modulating material layer 526. In some embodiments, the driving element 508 may include a thin film transistor (TFT). In some embodiments, the driving element 508 may include a source electrode 510, a drain electrode 512, a gate electrode 514 and an active layer 516. The gate electrode 514 may include, but is not limited to, polysilicon, metal or another conductive material. The metal may include, but is not limited to, copper (Cu), aluminum (Al), molybdenum (Mo), tungsten (W), gold (Au), chromium (Cr), nickel (Ni), platinum (Pt), titanium (Ti). The material of the active layer 516 may include amorphous semiconductor, poly-semiconductor and/or metal oxide. The semiconductor may include, but is not limited to, germanium (Ge), silicon (Si), tin (Sn), antimony (Sb), selenium (Se) or tellurium (Te). The metal oxide may include, but is not limited to, indium gallium zinc oxide (IGZO), indium zinc oxide (IZO), indium gallium zinc oxide (IGZTO). The source electrode 510 and the drain electrode 512 are disposed on the insulating layer 504 and on two sides of the gate electrode 514. In addition, the material of the drain electrode 512 and the source electrode 510 may include metal, such as copper (Cu), aluminum (Al), molybdenum (Mo), tungsten (W), gold (Au), chromium (Cr), nickel (Ni), platinum (Pt), titanium (Ti). The active layer 516 may include a channel region 518 that is disposed between the source electrode 510 and the drain electrode 512. As shown in FIG. 8B, the working device 540 does not be disposed in the second portion 20.

FIG. 8A illustrates that the gate electrode 514 is disposed under the insulating layer 504. Many variations and/or modifications can be made to embodiments of the disclosure. In some embodiments, the gate electrode 514 may be disposed above the active layer 516; the gate electrode 514 may have two portions, the first portion is disposed on the substrate 502, and the second portion is disposed on the protective layer 506. However, the scope of the disclosure is not intended to be limited.

As shown in FIG. 8A, in the first portion 10, the electronic modulating device 500 may include a conductive wire 520, the first electrode 522, the second electrode 524 and the modulating material layer 526. The material of the conductive wire 520, the first electrode 522 and the second electrode 524 may include metal, metal oxide and another suitable conductive material.

As shown in FIG. 8A, the modulating material layer 526 is disposed between the first electrode 522 and the second electrode 524. In some embodiments, the first electrode 522 and/or the second electrode 524 may be patterned and have multiple openings. The electronic field, between the first electrode 522 and the second electrode 524, may affect the status of the modulating material layer 526. In some embodiments, the first electrode 522 and/or the second electrode 524 may not extend to the second portion 20. In some embodiments, the first electrode 522 and/or the second electrode 524 may extend to the second portion 20.

In addition, the electronic modulating device 500 may include a display element layer 528 and/or a substrate 530. The display element layer 528 may be disposed on the second electrode 524. The display element layer 528 may include, but is not limited to, a light filter layer, a light shielding layer, a protective layer and/or other elements. The substrate 530 may include, but is not limited to, glass substrate, ceramic substrate, polymer substrate or another suitable substrate. In some embodiments, the electronic modulating device 500 may include an electromagnetic element (not shown), which is used to emit and/or receive electromagnetic signal.

In some embodiments, the electronic modulating device 500 may include an adjustment unit 532 and an adjustment unit 534 in the first portion 10. As shown in FIG. 8A, the adjustment unit 532 and the adjustment unit 534 may be disposed between the substrate 502 and the substrate 530. In some embodiments, the electronic modulating device 500 may include the adjustment unit 534 and an adjustment unit 536 in the second portion 20. As shown in FIG. 8B, the adjustment unit 534 and the adjustment unit 536 may be disposed between the substrate 502 and the substrate 530. In some embodiments, the adjustment unit 532, the adjustment unit 534 and the adjustment unit 536 may correspond to the adjustment unit 104a, the adjustment unit 108 and the adjustment unit 106a, respectively. However, the scope of the disclosure is not intended to be limited.

According to some embodiments of the present disclosure, the electronic modulating device may include the first adjustment unit that has the first recovering force per unit area and the second adjustment unit that has the second recovering force per unit area. The second recovering force is greater than the first recovering force. The unit area may be, but is not limited to, a rectangle region of 5 cm×5 cm, 3 cm×3 cm, 1 cm×1 cm or another suitable region. The first adjustment unit may be disposed on the region on which the working devices are disposed. The second adjustment unit may be disposed on the region on which the working device is not disposed. When the volume of the electronic modulating device changes, the distance between two substrates in the region that has greater recovering force may change more quickly or greatly. In the present disclosure, the distance between two substrates in the region that has the working devices may change more slowly or slightly. Therefore, the stability of the electronic modulating device may be improved. In some embodiments, the recovering force of the adjustment unit may be controlled by changing its elastic coefficient, material, the number of spacers, compressed length or thickness, density, another suitable parameter, or a combination thereof. In addition, the elastic coefficient may indicate spring constant or Young's modulus. However, the scope of the disclosure is not intended to be limited. In the present disclosure, the parameters mentioned above may be measured before assembly or after the electronic modulating device has been detached. The electronic modulating device of the present disclosure may be used in a display device, an antenna device, an automotive device, a touch device, a sensor device, another device, or a combination thereof.

Although some embodiments of the present disclosure and their advantages have been described in detail, it should be understood that various changes, substitutions and alterations can be made herein without departing from the spirit and scope of the disclosure as defined by the appended claims. Moreover, each of the claims constitutes an individual embodiment, and the scope of the disclosure also includes the scope of the various claims and combinations of the embodiments.

What is claimed is:

1. An electronic device, comprising:
    a first substrate comprising an edge, a first region, and a second region, wherein the second region is disposed between the edge and the first region, the first substrate further comprises a surface, and the surface has a normal direction;
    a first protrusion disposed on the surface of the first substrate in the first region, wherein a maximum distance from the surface of the first substrate to a first top surface of the first protrusion along the normal direction is defined as a first distance;
    a second protrusion disposed on the surface of the first substrate in the second region, wherein a maximum distance from the surface of the first substrate to a second top surface of the second protrusion along the normal direction is defined as a second distance; and
    a plurality of third protrusions disposed on the surface of the first substrate, wherein the first protrusion is disposed between two of the plurality of third protrusions, wherein a maximum distance from the surface of the first substrate to a third top surface of at least one of the plurality of third protrusions along the normal direction is defined as a third distance,
    wherein the first distance is different from the second distance, and the third distance is less than the first distance.

2. The electronic device according to claim 1, wherein the first region comprises:
    a driving element;
    a first electrode disposed on the driving element; and
    a second electrode overlapped with the first electrode.

3. The electronic device according to claim 2, wherein the driving element comprises:
    a gate electrode;
    a source electrode and a drain electrode disposed on opposite sides of the gate electrode; and
    an active layer electrically connected to the source electrode and the drain electrode.

4. The electronic device according to claim 1, further comprising a display element layer disposed on the surface of the first substrate in the first region.

5. The electronic device according to claim 4, wherein the display element layer comprises at least one of a light filter layer, a light shielding layer, and a protective layer.

6. The electronic device according to claim 1, wherein the second distance is greater than the first distance.

7. The electronic device according to claim 1, wherein the second distance is greater than the third distance.

8. The electronic device according to claim 1, wherein the first protrusion, the second protrusion and the plurality of third protrusions comprise photoresists.

9. The electronic device according to claim 1, wherein the second protrusion has a long strip shape in a top view.

* * * * *